United States Patent Office 2,745,758
Patented May 15, 1956

2,745,758
COATING COMPOSITION

Allan B. Ruddle, deceased, late of San Francisco, Calif., by Beatrice M. Ruddle, executrix, San Francisco, Calif.

No Drawing. Application August 6, 1952,
Serial No. 302,998

2 Claims. (Cl. 106—83)

This invention relates to coating compositions, and more particularly to coating compositions which will form dry, tough protective films on the objects to which they are applied.

An object of this invention is to provide a coating composition having mineral oil, i. e., pale oil, as a major constituent thereof which will form a dry and tough film, and which may therefore be used as a paint vehicle.

Other objects and advantages of the present invention will be apparent from the following description.

A preferred species of the coating composition of the invention is prepared in the following manner. First there is formed a mixture of the following constituents:

| | | |
|---|---|---|
| Water | gal__ | 1 |
| Aluminum sulphate | ozs__ | 1–10 |
| Alkali metal fluosilicate | ozs__ | 1–10 |
| Alkali metal silicate | gals__ | 2–20 |

The mixture made according to these specified proportions should preferably have a Baumé reading of not less than 32°. Preferred amounts within the above-specified ranges and the proper sequence of mixing of the constituents are as follows: one ounce of aluminum sulphate is thoroughly mixed and dissolved in one gallon of water which has been heated to a temperature of approximately 110° F.; one ounce of sodium fluosilicate is then added and mixed into the sulphate solution; and three gallons of sodium silicate of 40° Be'. are then added. The resulting mixture is hereinafter termed mixture A for convenience.

A solution of a mineral oil and gilsonite is then formed, the latter being a naturally occurring hydrocarbon mineral which may be properly termed an asphaltite. This hydrocarbon mineral is sometimes known as Uintaite by virtue of the fact that it is found only in the Uintah Basin of Colorado and Utah. The mineral oil and the gilsonite are mixed together in the approximate amounts of 40 cc. of oil and 15 grams of the hydrocarbon mineral, with heat being applied to melt the gilsonite in the oil. This solution is hereinafter designated as mixture B for purposes of convenience.

The next step in the formulation of this species of the coating composition of the invention is the addition of approximately 2 grams of sodium fluosilicate to approximately 50 cc. of mixture A. This mixture is thoroughly mixed until the resulting solution thickens, forming a silica gel. This may be termed mixture C.

Mixture C is then added to mixture B to form an emulsion. If emulsification does not readily take place upon the addition of these materials, it may readily be brought about by heating the mixture. The resulting emulsified paste, upon being thinned with mineral thinner, applied to wood or metal surfaces, and allowed to dry thereon, forms a film satisfactory for paint use.

This coating composition may be modified by varying the formulation of mixture B, as, for example, by using 10 grams of gilsonite and 5 grams of litharge in place of 15 grams of gilsonite.

By way of example of the formation of a paint embodying the coating compositions above-described, the following is given: to 15 cc. of the coating composition, 1 gram of ground gum dammar was added; the mixture was thinned with any suitable thinner, such as mineral thinner, and ground in a mortar; 2 grams of titanium pigment were thoroughly ground into the mix, followed by the addition of 2 grams of white lead paste; the material was then screened and 1 cc. of cobalt or manganese drier was added. Upon being thinned to a proper consistency with mineral thinner, the paint can be applied with either a brush or spray gun.

The described paint forms a hard, tough film which stands up very well when submerged in water. In comparative water submersion tests with prepared paints of well known brands, it was found that coatings of the latter on metal test panels either became soft or could be easily removed from the panels after about 5–7 days of continuous submersion, whereas the test coatings embodying the subject coating composition were much harder to remove after similar submersion periods, and in fact became hard and tough again after being out of the water for about two hours.

It has been further found that the coating composition resulting from the addition of mixtures B and C has remarkable temperature resistant properties when applied to metal surfaces and force-dried through the application of heat to the film. For example, when applied to a metal test panel and subjected to the heat of a gas burner, such as one on a conventional household gas stove, the coating is converted in about ten minutes time to a dry, hard, and extremely tough film. The burner heat should be applied slowly at the outset so as not to produce bubbles in the coating. After approximately two minutes of low heat, the burner may be turned up as high as possible and the high heat applied to the panel for about 6–7 minutes. A minor portion of the coating material is vaporized during the low heat period of the heating step, and when the evolution of vapor stops the coating is subjected to the high heat to convert it to a dry film. The temperature to which the panel is heated during the low heat phase of the drying operation is approximately 525° F., the temperature at which a small quantity of gas is given off by the gilsonite. The dry film can withstand exposure to temperatures as high as 900° F. for periods as long as 25 minutes, and when allowed to cool, the film retains its properties of hardness and toughness.

It has been further found that mixture B, when used alone to form a coating on a metal surface, will form a hard, tough, glossy film when subjected to heat in the manner described.

Mixture B is compatible with pigment materials, and when pigmented will dry under the action of heat to produce a film having the same characteristics as those described for mixture B in unpigmented form. By way of example of a pigmented form of mixture B the following is presented: to 15 cc. of mixture B there was added 30 cc. of titanium pigment in powder form and 10 cc. of mineral thinner. When a painted out film of this mixture was subjected to heat in the manner described, a tough, hard film was formed. When approximately ½ cc. of manganese drier was added to this mixture, a painted out film partially dried, in the absence of heat, in approximately 14 hours to a tacky condition in which it would not come off onto the hand when touched.

While specific examples of the coating composition of the invention have been described, it is to be understood that the invention is not intended to be limited to these examples, but is intended to include other formulations which differ from those set forth in the substitution of equivalents for the constituent materials of said coating composition examples.

What is claimed is:

1. A composition composed of the emulsified product resulting from the admixture of approximately equal amounts by volume of a first mixture of 40 cc. of gilsonite in 15 grams of a mineral oil with a second mixture having the following proportions of constituents:

| | | |
|---|---|---|
| Water | gallons | 1 |
| Aluminum sulphate | ounces | 1–10 |
| Sodium fluosilicate | do | 1–10 |
| Sodium silicate | gallons | 2–20 |

2. A coating composition comprising the emulsified product resulting from the admixture of a first mixture of gilsonite in a mineral oil, the approximate relative proportions of said constituents being 15 grams of gilsonite and 40 cc. of a mineral oil, with approximately 50 cc. of a second mixture comprising the following constituents in the indicated relative proportions:

| | | |
|---|---|---|
| Water | gallons | 1 |
| Aluminum sulphate | ounces | 1–10 |
| Sodium fluosilicate | do | 1–10 |
| Sodium silicate | gallons | 2–20 | said amount of said second mixture having incorporated therein after formulation approximately 2 grams of sodium fluosilicate, said emulsified product having the property of being able to form a satisfactory coating film for wood and metal surfaces upon being diluted with a compatible thinner.

References Cited in the file of this patent

UNITED STATES PATENTS

| | | |
|---|---|---|
| 1,349,601 | Buckner | Aug. 17, 1920 |
| 1,900,211 | Watson | Mar. 7, 1933 |
| 1,989,775 | Smith | Feb. 5, 1935 |
| 2,102,957 | Kaufler | Dec. 21, 1937 |
| 2,167,638 | Clark | Aug. 1, 1939 |
| 2,201,981 | Baron | May 28, 1940 |
| 2,483,836 | McCoy | Oct. 4, 1949 |

OTHER REFERENCES

Abraham: Asphalts and Allied Substances, 1920, pp. 129, 464 and 465.